(12) United States Patent
Song et al.

(10) Patent No.: US 9,872,019 B2
(45) Date of Patent: Jan. 16, 2018

(54) METHOD AND DEVICE FOR DEBLOCKING-FILTERING, AND METHOD AND DEVICE FOR ENCODING AND DECODING USING SAME

(75) Inventors: Jinhan Song, Seoul (KR); Jeongyeon Lim, Gyeonggi-do (KR); Byeungwoo Jeon, Gyeonggi-do (KR); Joohee Moon, Seoul (KR); Yunglyul Lee, Seoul (KR); Haekwang Kim, Seoul (KR); Jongki Han, Seoul (KR); Jungyoup Yang, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 1170 days.

(21) Appl. No.: 13/811,596

(22) PCT Filed: Jul. 20, 2011

(86) PCT No.: PCT/KR2011/005359
§ 371 (c)(1),
(2), (4) Date: Apr. 11, 2013

(87) PCT Pub. No.: WO2012/011744
PCT Pub. Date: Jan. 26, 2012

(65) Prior Publication Data
US 2013/0287097 A1   Oct. 31, 2013

(30) Foreign Application Priority Data

Jul. 20, 2010   (KR) .................. 10-2010-0070180
Mar. 15, 2011  (KR) .................. 10-2011-0022666
Jul. 20, 2011   (KR) .................. 10-2011-0072071

(51) Int. Cl.
*H04N 19/176*   (2014.01)
*H04N 19/86*    (2014.01)
(Continued)

(52) U.S. Cl.
CPC ..... *H04N 19/00909* (2013.01); *H04N 19/117* (2014.11); *H04N 19/136* (2014.11);
(Continued)

(58) Field of Classification Search
CPC ....................................................... H04N 19/00
See application file for complete search history.

(56) References Cited

U.S. PATENT DOCUMENTS

2007/0286283 A1* 12/2007 Yin .................. H04N 19/70
375/240.16

FOREIGN PATENT DOCUMENTS

CN   101040533 A   9/2007
CN   101207817 A   6/2008
(Continued)

OTHER PUBLICATIONS

List et al. "Adaptive Deblocking Filter", IEEE Transactions on Circuits and Systems for Video Technology, vol. 13, No. 7, Jul. 2003.*

(Continued)

*Primary Examiner* — Jorge L Ortiz Criado
*Assistant Examiner* — Kyle Lotfi
(74) *Attorney, Agent, or Firm* — Hauptman Ham, LLP

(57) ABSTRACT

An encoding apparatus for encoding a video signal includes: a prediction unit for generating a prediction block of a current block by using intra prediction or inter prediction; a residual data encoding unit for generating a residual block by using the current block and the prediction block, and transforming and quantizing the residual block; a residual data decoding unit for decoding a transformed and quantized residual block by inversely quantizing and inversely transforming the transformed and quantized residual block; and a deblocking filter unit for generating a reconstructed block by using a decoded residual block and the prediction block, (Continued)

and performing deblocking filtering, based on inter prediction information and intra prediction information of the reconstructed block and blocks neighboring the reconstructed block. The intra prediction information includes at least one of an intra prediction mode and an intra prediction block size.

3 Claims, 16 Drawing Sheets

(51) Int. Cl.
  *H04N 19/117* (2014.01)
  *H04N 19/159* (2014.01)
  *H04N 19/136* (2014.01)
  *H04N 19/82* (2014.01)
  *H04N 19/167* (2014.01)

(52) U.S. Cl.
  CPC .......... *H04N 19/159* (2014.11); *H04N 19/86* (2014.11); *H04N 19/167* (2014.11); *H04N 19/82* (2014.11)

(56) References Cited

FOREIGN PATENT DOCUMENTS

| CN | 101472176 A | 7/2009 |
|---|---|---|
| KR | 10-2008-0056083 | 6/2008 |
| KR | 10-2009-0095014 | 9/2009 |
| KR | 10-2010-0045007 | 5/2010 |
| WO | 2010047499 A2 | 4/2010 |

OTHER PUBLICATIONS

Yadav et al, Optimization of the Deblocking Filter in H.264 Codec for Real Time Implementation, IEEE International Conference on Image Processing, 2005. ICIP 2005.*

Chinese Office Action dated May 20, 2015.

International Search Report dated Mar. 26, 2012 for PCT/KR2011/005359.

* cited by examiner

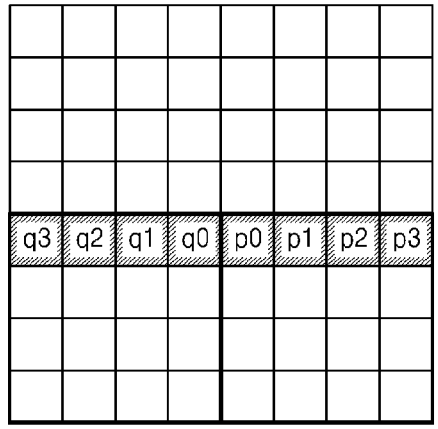 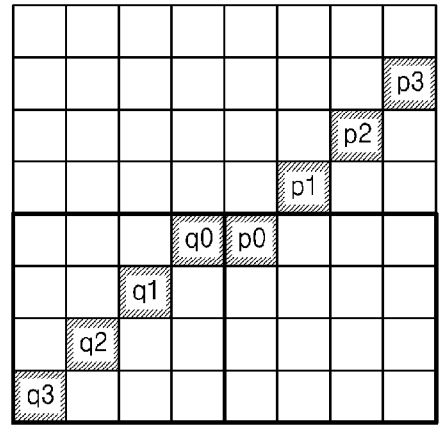
*FIG. 12A*  *FIG. 12B*
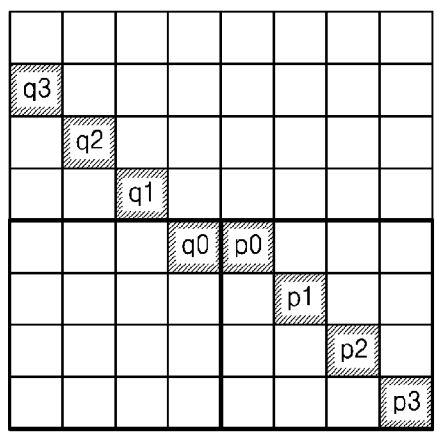 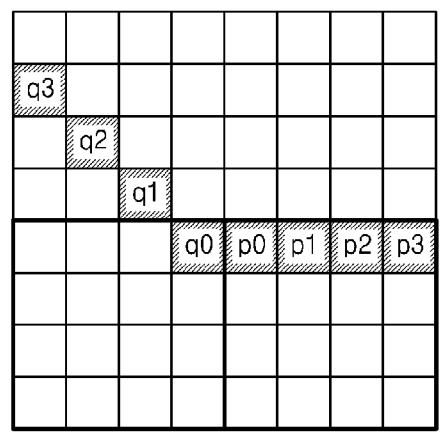
*FIG. 12C*  *FIG. 12D*

(A) 4x4 Intra Prediction Mode (B) 16x16 Intra Prediction Mode

METHOD AND DEVICE FOR DEBLOCKING-FILTERING, AND METHOD AND DEVICE FOR ENCODING AND DECODING USING SAME

CROSS REFERENCE TO RELATED APPLICATION

This application claims the priority of Korean Patent Application No. 10-2010-0070180, filed on Jul. 20, 2010, No. 10-2011-0022666, filed on Mar. 15, 2011, and No. 10-2011-0072071, filed on Jul. 20, 2011 in the KIPO (Korean Intellectual Property Office). Further, this application is the National Phase application of International Application No. PCT/KR2011/005359 filed on Jul. 20, 2011, which designates the United States and was published in Korean.

TECHNICAL FIELD

The present disclosure in one or more embodiments relates to a deblocking filtering method and apparatus for reducing blocking artifact occurring in the process of encoding and decoding images, and an encoding and decoding method and apparatus using the same.

BACKGROUND

The statements in this section merely provide background information related to the present disclosure and may not constitute prior art.

In video encoding, when an image is encoded and then reconstructed in units of blocks, distortion occurs in block boundaries due to block-unit prediction and quantization. The phenomenon that distortion occurs in block boundaries is referred to as blocking artifact.

In the existing video encoding standards, such as MPEG-1, MPEG-2, and H.263, a reconstructed image is stored in a reference picture memory, without processing blocking artifact. Therefore, a subjective video quality of an image is degraded. Furthermore, referencing an image containing blocking artifact during a motion compensation leads to video quality degradation accumulated in an encoded image. The consequence of letting an image with the video quality degradation is reduction of the encoding efficiency.

In order to solve these problems, the conventional H.264/AVC attempts to minimize blocking artifact by applying a deblocking filter before storing a reconstructed image in a picture memory. In this manner, the conventional H.264/AVC increases a subjective video quality and improves encoding efficiency through a more accurate signal prediction. However, if deblocking filtering is performed on an image showing no blocking artifact, unnecessary computation increases and unintended video quality degradation may unnecessarily occur. Therefore, in order to perform deblocking filtering more effectively, it is necessary to adaptively perform different levels of deblocking filtering according to the degree of blocking artifact.

The H.264/AVC standard adaptively performs the deblocking filtering according to the degree of the blocking artifact. That is, a boundary strength (BS) value for determining filtering strength is determined, and a different level of deblocking filtering is performed according to the determined BS value. The BS value ranges from 0 to 4. As the BS value is larger, it is necessary to perform stronger deblocking filtering. That is, when the BS value is 0, no deblocking filtering is performed. When the filtering strength value is 4, the strongest deblocking filtering is performed.

A deblocking filtering method of the H.264/AVC standard, which is the conventional technology using the deblocking filtering, will be described below in detail.

FIG. 1 shows a block unit and sequence to which deblocking filtering used in the conventional H.264/AVC standard is applied.

The H.264/AVC standard determines the block unit to which deblocking filtering is applied according to a transform block. That is, if a transform block of 4×4 unit is used, a block to which deblocking filtering is applied also becomes 4×4 unit. The H.264/AVC standard may use a transform block of 8×8 unit, as well as the transform block of 4×4 unit. Therefore, if the transform block of 8×8 unit is used, a block to which deblocking filtering is applied also becomes 8×8 unit. For convenience of description, FIG. 1 assumes the case of using the transform block of 4×4 unit.

Referring to FIG. 1, deblocking filtering is performed on a luma signal block of 16×16 unit in the orders of vertical directions a, b, c and d of 4×4 unit and horizontal directions e, f, g and h of 4×4 unit. In a similar manner to the luma signal block, deblocking filtering is performed on a chroma signal block of 8×8 unit in the orders of vertical directions i and j of 4×4 unit and horizontal directions k and l of 4×4 unit.

FIG. 2 shows pixels p0, p1, p2 and p3 and pixels q0, q1, q2 and q3 of neighboring blocks P and Q for determining BS, and FIG. 3 shows a process of determining a BS in the H.264/AVC standard.

Referring to FIG. 3, it is determined whether the block P or Q shown in FIG. 2 is an intra prediction block (S310). When the block P or Q is the intra prediction block, it is determined whether the pixels p0 and q0 are located at a macroblock boundary (S320). When the pixels p0 and q0 are located at the macroblock boundary, BS value is 4. On the other hand, when the pixels p0 and q0 are not located at the macroblock boundary, BS value is 3.

When step S310 determines that both of the blocks P and Q are the inter mode, it is determined whether a nonzero transform coefficient of residual data exists in the block where the pixel p0 or q0 is located (S330). When the nonzero transform coefficient exists, BS value is 2.

However, when the nonzero transform coefficient does not exist, BS value is 1 in the case where the pixels p0 and q0 use different reference pictures or have different motion vector values; otherwise, BS value is 0 (S340).

That is, in order to selectively remove distortion between blocks, which is caused by block-unit prediction and quantization, the H.264/AVC standard selectively uses deblocking filters having different strengths, considering quantization parameter (QP), encoding mode, motion information (reference picture, motion vector).

The H.264/AVC standard performs the selective deblocking filtering on the inter prediction block, additionally considering the motion information and the like. However, with respect to the intra prediction block, the H.264/AVC standard merely references whether the intra prediction block is the boundary of the macroblock, and does not perform the selective deblocking filtering considering the intra prediction information. Therefore, in order to perform a further improved deblocking filtering on the intra prediction block, there is a need for a method that adaptively performs deblocking filtering according to intra prediction information.

DISCLOSURE

Technical Problem

Therefore, the present disclosure is directed to improve a subjective picture quality and encoding efficiency by adaptively performing deblocking filtering on an intra prediction block according to intra prediction information.

SUMMARY

An embodiment of the present disclosure provides an encoding apparatus for encoding a video signal, including: a prediction unit for generating a prediction block of a current block by using intra prediction or inter prediction; a residual data encoding unit for generating a residual block by using the current block and the prediction block, and transforming and quantizing the residual block; a residual data decoding unit for decoding a transformed and quantized residual block by inversely quantizing and inversely transforming the transformed and quantized residual block; and a deblocking filter unit for generating a reconstructed block by using a decoded residual block and the prediction block, and performing deblocking filtering, based on inter prediction information and intra prediction information of the reconstructed block and blocks neighboring the reconstructed block.

When the reconstructed block and at least one of the blocks neighboring the reconstructed block are intra-predicted, the deblocking filter unit may adaptively determine the filtering strength, based on at least one of existence/nonexistence of a nonzero transform coefficient exists in the reconstructed block and at least one of the neighboring blocks, intra prediction information of the reconstructed block and the neighboring blocks, macroblock mode information of the reconstructed block and the neighboring blocks, and block boundary directions of the reconstructed block and the neighboring blocks.

When the reconstructed block is intra-predicted, the deblocking filter unit may determine the filtering strength, based on at least one of whether the nonzero transform coefficient exists in the reconstructed block and whether the deblocking direction of the reconstructed block and the intra prediction direction are identical to each other.

The deblocking filter unit may adaptively determine target pixels to be filtered, based on the intra prediction information.

The deblocking filter unit may determine the number of the target pixels, based on an intra prediction block size included in the intra prediction information.

The deblocking filter unit may determine a filtering direction of the target pixels, based on an intra prediction mode included in the intra prediction information.

Another embodiment of the present disclosure provides a decoding apparatus for decoding a video signal, including: a residual data decoding unit for decoding a transformed and quantized residual block input thereto by inversely quantizing and inversely transforming the transformed and quantized residual block; a prediction unit for generating a prediction block, based on inter prediction information or intra prediction information input thereto; and a deblocking filter unit for generating a reconstructed block by using a decoded residual block and the prediction block, and performing deblocking filtering, based on the inter prediction information and the intra prediction information of the reconstructed block and blocks neighboring the reconstructed block.

When the reconstructed block and at least one of the blocks neighboring the reconstructed block are intra-predicted, the deblocking filter unit may adaptively determine the filtering strength, based on at least one of existence/nonexistence of a nonzero transform coefficient exists in the reconstructed block and at least one of the neighboring blocks, intra prediction information of the reconstructed block and the neighboring blocks, macroblock mode information of the reconstructed block and the neighboring blocks, and block boundary directions of the reconstructed block and the neighboring blocks.

When the reconstructed block is intra-predicted, the deblocking filter unit may determine the filtering strength, based on at least one of whether the nonzero transform coefficient exists in the reconstructed block and whether the deblocking direction of the reconstructed block and the intra prediction direction are identical to each other.

The deblocking filter unit may adaptively determine target pixels to be filtered, based on the intra prediction information.

The deblocking filter unit may determine the number of the target pixels, based on an intra prediction block size included in the intra prediction information.

The deblocking filter unit may determine a filtering direction of the target pixels, based on an intra prediction mode included in the intra prediction information.

Still another embodiment of the present disclosure provides a deblocking filtering apparatus that, when at least one of two neighboring blocks is intra-predicted, adaptively determines filtering strength, based on at least one of existence/nonexistence of a nonzero transform coefficient in at least one of the two neighboring blocks, intra prediction information of the two neighboring blocks, macroblock mode information of the two neighboring blocks, and block boundary directions of the two neighboring blocks.

Yet another embodiment of the present disclosure provides a deblocking filtering apparatus that, when a current block is intra-predicted, adaptively determine filtering strength, based on at least one of whether a nonzero transform coefficient exists in the current block and whether a deblocking direction of the current block and an intra prediction direction of the current block are identical to each other.

Yet another embodiment of the present disclosure provides a deblocking filtering apparatus that, when at least one of two neighboring blocks is intra-predicted, adaptively determines target pixels to be filtered, based on intra prediction information including at least one of an intra prediction mode and an intra prediction block size.

The deblocking filtering apparatus may adaptively determine the number of the target pixels, based on the intra prediction block size.

The deblocking filtering apparatus may adaptively determine the positions (filtering direction) of the target pixels, based on the intra prediction mode.

Yet another embodiment of the present disclosure provides an encoding method, a decoding method, and a deblocking filtering method that are performed in the encoding apparatus, the decoding apparatus, and the deblocking filtering apparatus described above.

Advantageous Effects

According to the present disclosure as described above, a subjective video quality and encoding efficiency can be improved by reducing blocking artifact even with respect to an intra prediction block.

DESCRIPTION OF DRAWINGS

FIGS. 11 to 13 are diagrams for describing a process of determining a target pixel to be filtered by a filtering pixel determination unit according to one or more embodiments of the present disclosure;

DETAILED DESCRIPTION

Figure 1:
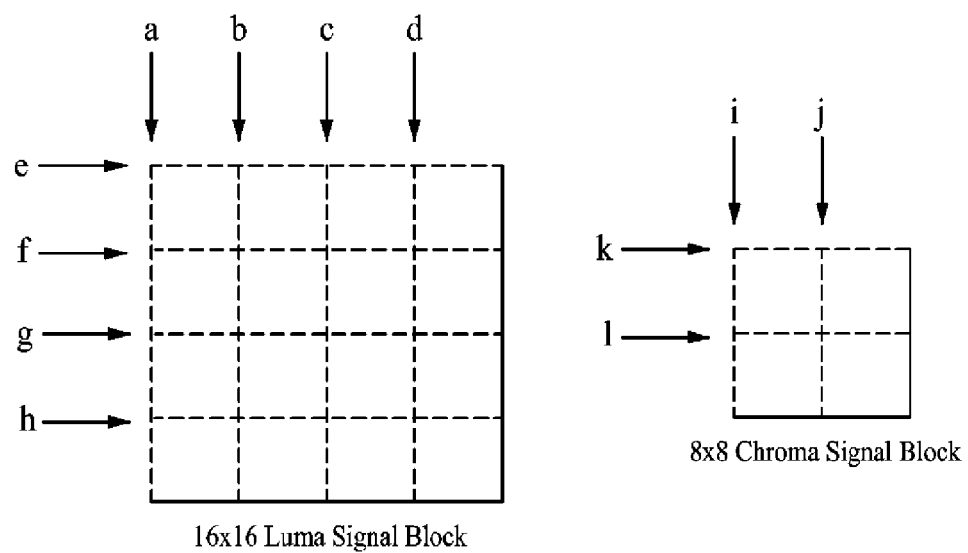
FIG. 1 shows a block unit and sequence to which deblocking filtering is applied as used in the conventional H.264/AVC standard.

Hereinafter, embodiments of the present disclosure will be described in detail with reference to the accompanying drawings. In the following description, like reference numerals designate like elements although they are shown in different drawings. Further, in the following description of the present embodiments, a detailed description of known functions and configurations incorporated herein will be omitted for the purpose of clarity.

Additionally, in describing the components of the present disclosure, there may be terms used like first, second, A, B, (a), and (b). These are solely for the purpose of differentiating one component from the other but not to imply or suggest the substances, order or sequence of the components. If a component were described as 'connected', 'coupled', or 'linked' to another component, they may mean the components are not only directly 'connected', 'coupled', or 'linked' but also are indirectly 'connected', 'coupled', or 'linked' via a third component.

Figure 4:
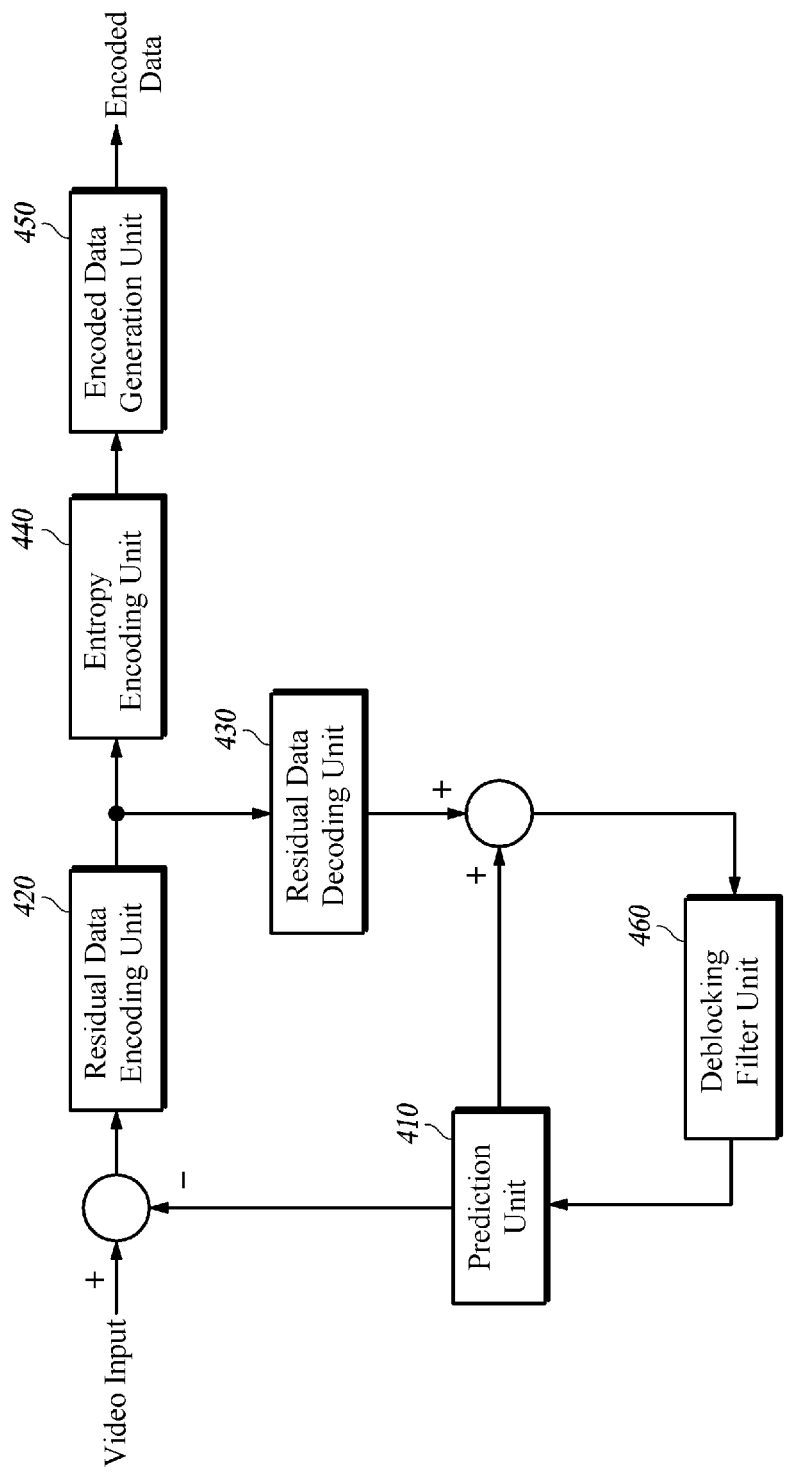
FIG. 4 is a block diagram showing a configuration of an encoding apparatus to which a deblocking filtering apparatus according to one or more embodiments of the present disclosure is applied.

FIG. 4 is a block diagram showing a configuration of an encoding apparatus to which a deblocking filtering apparatus according to one or more embodiments of the present disclosure is applied.

Referring to FIG. 4, a moving picture encoding apparatus, to which a deblocking filtering apparatus according to one or more embodiments of the present disclosure is applied, may include a prediction unit 410, a residual data encoding unit 420, a residual data decoding unit 430, an entropy encoding unit 440, an encoded data generation unit 450, and a deblocking filter unit 460.

A video input to be encoded may be input in units of blocks, for example, macroblocks. For convenience of description, in the embodiment of the present disclosure, the macroblock is defined as a 16×16 form in the same manner as the H.264/AVC standard. However, the macroblock form may be M×N. In this case, M and N may be greater than 16, or may be the same or different integers. In addition, there is no necessity to limit the block unit to specific unit called a macroblock in the related art. That is, it should be understood that the block unit is a concept encompassing units such as coding unit (CU) or largest CU (LCU).

The prediction unit 410 receives any one of macroblock modes for predicting a current block and generates a prediction block by predicting a current block to be encoded in unit corresponding to the received macroblock mode (for example, 16×16, 16×8, 8×16, 8×8, 8×4, 4×8, or 4×4 pixel unit).

That is, the prediction unit 410 predicts the current block by using intra prediction or inter prediction, and generates the prediction block having a predicted pixel value as a pixel value of each pixel.

In the case of the intra prediction, the prediction unit 410 generates an intra prediction block of the current block by using available pixel values of pixels located spatially neighboring the current block. In this case, error values between the current block and the intra prediction block with respect to the available intra prediction modes are calculated, and the intra prediction block is generated by applying the intra prediction mode having the minimum error value. In addition, the intra prediction mode having the minimum error value is encoded, and information about the intra prediction mode is provided to the encoded data generation unit 450.

Figure 15A:
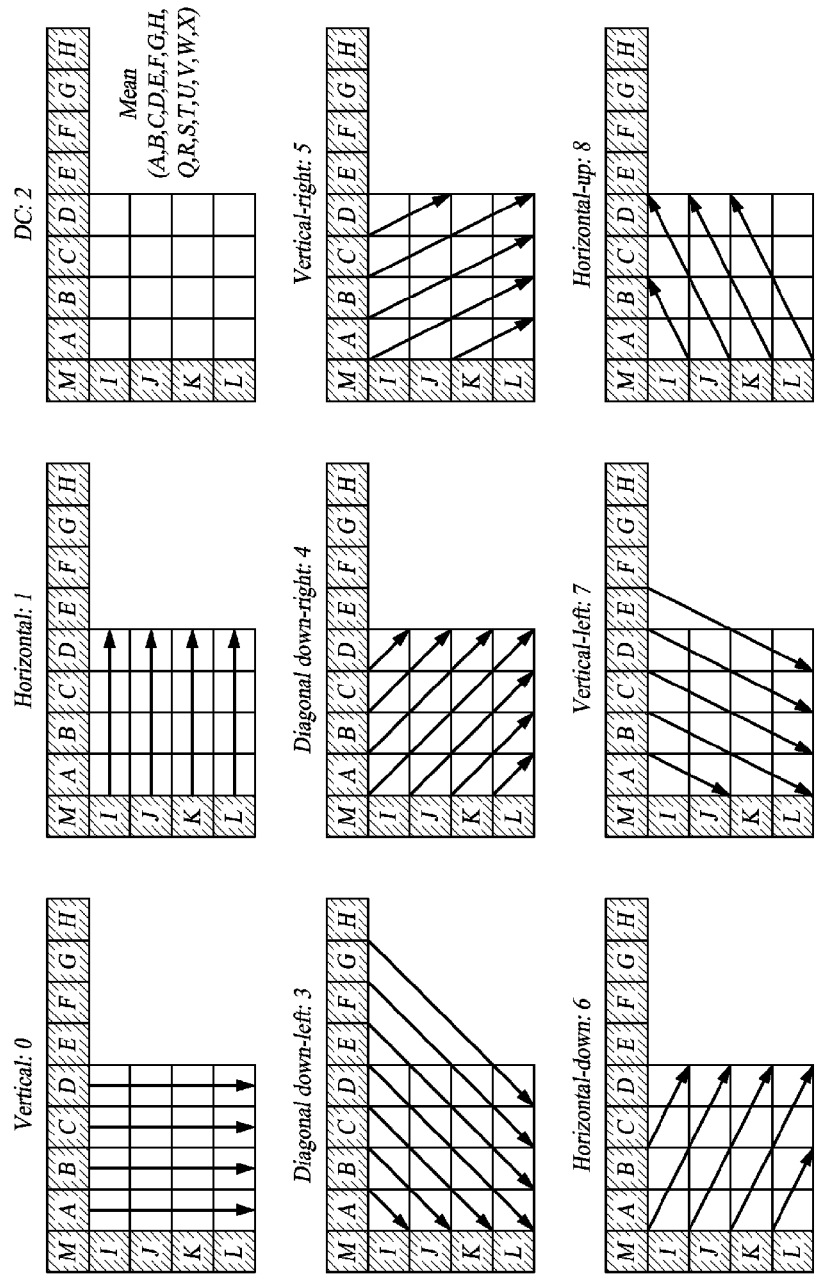
FIG. 15 is a diagram showing an intra prediction mode defined in the H.264/AVC standard.
Figure 15B:
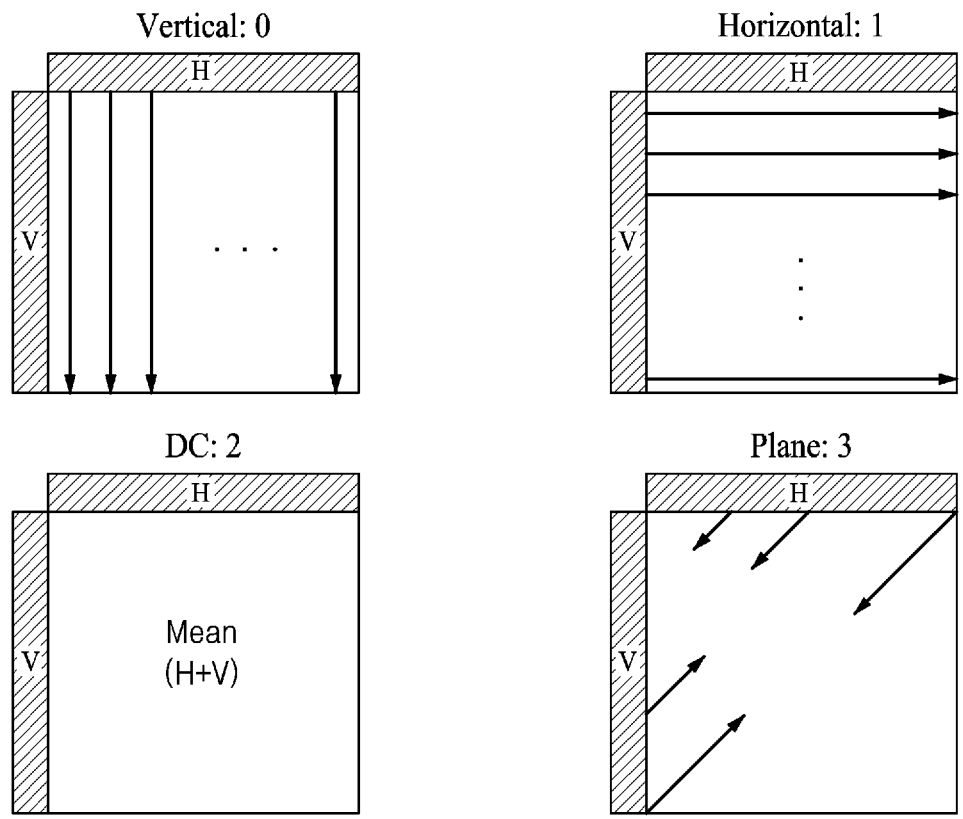

In the embodiment of the present disclosure, as shown in FIG. 15, nine intra prediction modes (in the case of 4×4 and 8×8 intra blocks) and four intra prediction modes (in the case of 16×16 intra block) having directions in the same manner as the H.264/AVC standard are taken as an example, but the intra prediction modes may be defined in more various methods. For example, L intra prediction modes having directions in an M×N intra prediction block may be used. In particular, M and N may be greater than 16 and may be the same or different integers.

In the case of the inter prediction, the prediction unit 410 calculates error values between the current block and the inter prediction block with respect to all available reference pictures located temporally neighboring the current picture, and generates the inter prediction block of the reference picture having the minimum error value as the inter prediction block of the current block. In this case, a motion vector is estimated based on the positions of the current block and the inter prediction block having the minimum error value. In addition, the estimated motion vector and index information of the reference picture are provided to the encoded data generation unit 450.

A residual block is generated by subtracting the prediction block generated by using the intra or inter prediction from the current block. That is, the residual block is generated by calculating a difference between an original pixel value of each pixel of the current block and a predicted pixel value of each pixel of the prediction block. The generated residual block is provided to the residual data encoding unit 420.

The residual data encoding unit 420 transforms and quantizes the residual block, and generates an encoded residual block. In this case, the transform scheme may use various methods for transforming a space-domain signal into a frequency-domain signal, such as Hadamard transform, discrete cosine transform, and the like. The quantization scheme may use various quantization methods, such as uniform quantization with dead zone, quantization matrix, and the like.

According to one or more embodiments of the present disclosure, the size of the transform block may not exceed the size of the prediction block. For example, when the size of the prediction block is 16×16, the 16×16, 16×8, 8×16, 8×8, 8×4, 4×8, or 4×4 transform block, which does not exceed 16×16, may be used. When the size of the prediction block is 8×8, the 8×8, 8×4, 4×8, or 4×4 transform block, which does not exceed 8×8, may be used. When the size of the prediction block is 4×4, only the 4×4 transform block may be used. In addition, the size of the transform block may be selected based on rate-distortion optimization. When the size of the transform block does not exceed the size of the prediction block, the residual data encoding unit 420 divides the residual block into subblocks having the same size as that of the transform block, and sequentially transforms and quantizes the subblocks.

According to another embodiment of the present disclosure, the size of the transform block may exceed the size of the prediction block. For example, when the size of the prediction block is 16×16, the 32×16, 16×32, 32×32, 64×32, 32×64, or 64×64 transform block may be used. When the size of the transform block is larger than the size of the prediction block, the residual data encoding unit 420 generates a combined residual block having the same size as that of the transform block by combining a plurality of residual blocks spatially neighboring one another, and transforms and quantizes the combined residual block.

The residual data decoding unit 430 reconstructs the residual block by inversely quantizing and inversely transforming the residual block transformed and quantized by the residual data encoding unit 420. The inverse quantization and the inverse transform are achieved by inversely performing the transform process and the quantization process that were performed by the residual data encoding unit 420. The inverse quantization and the inverse transform may be implemented in various methods. For example, the transform and inverse transform or the quantization and inverse quantization having the same process, which are in a pre-arrangement between the residual data encoding unit 420 and the residual data decoding unit 430, may be used. Alternatively, the residual data decoding unit 430 may perform the inverse quantization and inverse transform by inversely performing the transform and quantization process of the residual data encoding unit 420 by using information about the transform and quantization process (for example, transform size, transform shape, quantization type, and the like) generated and transferred by the transform and quantization process of the residual data encoding unit 420.

The residual block output from the residual data decoding unit 430 is added to the prediction block reconstructed by the prediction unit 410 and then generated as the reconstructed block.

The entropy encoding unit 440 performs entropy encoding on the residual block output from the residual data encoding unit 420. Although not shown in the embodiment of the present disclosure, if necessary, the entropy encoding unit 440 may encode various pieces of information necessary for decoding encoded bitstream, as well as the residual block. The various pieces of information necessary for decoding the encoded bitstream may include information about the block type, information about the intra prediction mode when the prediction mode is the intra prediction mode, information about the motion vector when the prediction mode is the inter prediction mode, and information about the transform and quantization type.

The entropy encoding unit 440 may use various entropy encoding methods, for example, context adaptive variable length coding (CAVLC) and context adaptive binary arithmetic coding (CABAC).

The encoded data generation unit 450 arranges the entropy-encoded residual block, the macroblock mode, and the encoded prediction information (for example, information about the intra prediction mode in the case of the intra encoding, and information about the reference picture index and the motion vector in the case of the inter encoding) and outputs the encoded data.

The deblocking filter unit 460 filters the reconstructed current block so as to reduce blocking artifact generated by the block-unit prediction and quantization. According to one or more embodiments of the present disclosure, the deblocking filter unit 460 may perform adaptive deblocking filtering by using information about the block-unit prediction to be transmitted together with the reconstructed current block (for example, information about the intra prediction mode and the intra prediction block size in the case of the intra encoding, and information about the reference picture index and the motion vector in the case of the inter encoding) or information about the transform and quantization (for example, information about the size and shape of the transform block and the quantization parameter). In this case, the information about the prediction or quantization may be transferred to the deblocking filter unit 460 of the encoding apparatus, or may be generated as the encoded data by the encoded data generation unit 450 and transferred to the decoding apparatus.

The deblocking filter unit 460 performs deblocking filtering on the pixels around the block boundary. In the embodiment of the present disclosure, on an assumption of using the transform block of 4×4 unit, the block unit and filtering order, to which the deblocking filtering is applied, are exemplified as shown in FIG. 1. However, the transform block may be defined in various methods. In addition, the deblocking filtering in accordance with the conventional H.264 standard filters the boundary pixels of the 4×4 transform block or the 8×8 transform block. However, according to the present disclosure, as will be described in the following embodiments, pixels of the boundary region between prediction blocks as well as pixels of the boundary region between transform blocks may be adaptively deblocking-filtered according to prediction information of the prediction blocks.

Hereinafter, the deblocking filter unit 460 will be described in more detail with reference to FIGS. 5 to 13.

Figure 5:
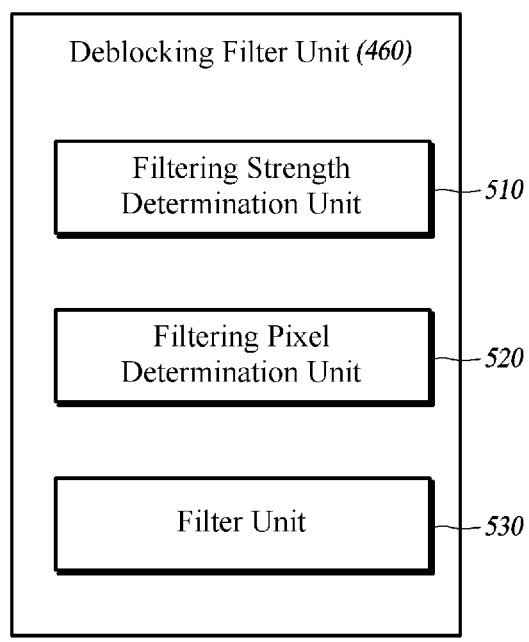
FIG. 5 is a block diagram showing a configuration of a deblocking filter unit according to one or more embodiments of the present disclosure.

FIG. 5 is a block diagram showing the configuration of the deblocking filter unit according to one or more embodiments of the present disclosure.

Referring to FIG. 5, the deblocking filter unit 460 may include a filtering strength determination unit 510, a filtering pixel determination unit 520, and a filter unit 530.

The filtering strength determination unit 510 performs a filtering strength determining process so as to adaptively remove blocking artifact generated by the block-unit prediction and quantization and determine whether the boundary to be filtered corresponds to the boundary the image actually has or corresponds to the boundary generated by the block-unit prediction and quantization. Whether to filter the relevant boundary and the filtering execution strength may be differently applied according to the filtering strength obtained through the filtering strength determination unit 510.

The filtering strength may be adjusted in various methods.

As the simplest method, the filtering strength may be adjusted by controlling a filter cutoff frequency. For example, the filtering strength may be increased by setting the filter such that the cutoff frequency is further lowered, and the filtering strength may be decreased by setting the filter such that the cutoff frequency is further raised. In this manner, the filtering strength may be adjusted.

As another method, the filtering strength may be increased or decreased by controlling the filter characteristic such that smoothing is performed much more or much less.

As still another method, the filtering strength is adjusted such that a maximum changeable range of a pixel value changed by filtering is limited. That is, the filtering strength is adjusted such that a difference between a pixel value after filtering and a pixel value before filtering exceeds a predetermined threshold value (tc). More specifically, the value after filtering may be limited to a range of +/−tc from the value before filtering (hereinafter, referred to as A), that is, a range of A−tc to A+tc. This process is generally referred to as clipping. For example, comparing the case of tc=3 and the case of tc=4, it may be considered that the case of tc=3 is weaker in filtering strength than tc=4. This is because a variation of a value changeable by filtering is limited as much. That is, the filtering strength may be adjusted by regulating the clipping threshold tc.

As yet another method, the filtering strength may be adjusted by differently setting the BS. This method corresponds to one method or a combination of one or more methods of setting one parameter adjusting the filtering strength as the BS and then adjusting the above-described filtering strength with respect to each BS value. For example, when the BS is strong, the above methods may be appropriately combined to make the filtering relatively strong. On the other hand, when the BS is weak, the above methods may be appropriately combined to make the filtering relatively weak.

In the case where the current block and at least one of blocks neighboring the current block have been intra-predicted, the filtering strength determination unit 510 may adaptively determine the filtering strength, based on at least one piece of information among existence/nonexistence of a nonzero transform coefficient in the current block and at least one of the neighboring blocks, intra prediction information of the current block and the neighboring blocks, macroblock mode information of the current block and the neighboring blocks, and block boundary direction.

For example, in the case where the current block and at least one of the blocks neighboring the current block have been intra-predicted, when the nonzero transform coefficient exists in the current block and at least one of the neighboring blocks, the filtering strength determination unit 510 may assign higher filtering strength than the case where the nonzero transform coefficient does not exist.

In addition, in the case where the current block and at least one of the blocks neighboring the current block have been intra-predicted, the filtering strength determination unit 510 may adaptively determine the filtering strength according to whether intra prediction information of the current block and intra prediction information of the neighboring block are identical to each other. For example, in the case where the intra prediction information of the current block and the intra prediction information of the neighboring block are not identical to each other, the filtering strength determination unit 510 may assign higher filtering strength than the case where the intra prediction information of the current block and the intra prediction information of the neighboring block are identical to each other. Furthermore, in the case where the current block and the neighboring block have identical intra prediction information, the filtering strength determination unit 510 may perform no deblocking filtering. The intra prediction information may include at least one of the intra prediction mode and the intra prediction block size.

In addition, in the case where the current block and at least one of the blocks neighboring the current block have been intra-predicted, the filtering strength determination unit 510 may adaptively determine the filtering strength, based on whether the macroblock mode information of the current block and the macroblock mode information of the neighboring block are identical to each other. For example, in the case where the current block and the neighboring block do not have identical macroblock mode information, the filtering strength determination unit 510 may assign higher filtering strength than the case where the current block and the neighboring block have identical macroblock mode information.

In addition, in the case where the current block and at least one of the blocks neighboring the current block have been intra-predicted, the filtering strength determination unit 510 may adaptively determine the filtering strength according to whether the block boundary direction and the intra prediction mode (prediction direction) are identical to each other. For example, in the case where the block boundary direction and the intra prediction direction are not identical to each other, the filtering strength determination unit 510 may assign higher filtering strength than the case where the block boundary direction and the intra prediction direction are identical to each other.

On the other hand, in the case where neither of the current block and the neighboring block has been intra-predicted, the filtering strength determination unit 510 may determine the filtering strength, based on existence/nonexistence of the nonzero transform coefficient in the current block and at least one of the neighboring blocks and the inter prediction information. For example, in the case where the nonzero transform coefficient exists in the current block and at least one of the neighboring blocks, the filtering strength determination unit 510 may assign higher filtering strength than the case where the nonzero transform coefficient does not exist in the current block and at least one of the neighboring blocks. In addition, inter prediction information of the current block is compared with inter prediction information of the neighboring block. If the inter prediction information of the current block and the inter prediction information of the neighboring block are not identical to each other, the filtering strength determination unit 510 may assign higher filtering strength than the case where the inter prediction information of the current block and the inter prediction information of the neighboring block are identical to each other. Furthermore, if the inter prediction information of the current block and the inter prediction information of the neighboring block are identical to each other, the filtering strength determination unit 510 may perform no deblocking filtering. The inter prediction information may include information about reference picture/reference frame, motion vector, and the like.

On the other hand, if the current block is the intra prediction block, the filtering strength determination unit 510 may determine the filtering strength in consideration of only encoding information of the current block, instead of encoding information of the current block and all neighboring blocks. That is, if the current block is the intra prediction block, the filtering strength determination unit 510 may determine the filtering strength according to at least one of whether the nonzero transform coefficient exists in the current block and whether the deblocking direction and the intra prediction direction are identical to each other.

For example, if the nonzero transform coefficient exists in the current block, the filtering strength determination unit 510 may assign higher filtering strength than the case where the nonzero transform coefficient does not exist in the current block. In addition, if the block boundary direction and the intra prediction direction are not identical, the filtering strength determination unit 510 may assign higher filtering strength than the case where the block boundary direction and the intra prediction direction are identical. Details will be described below with reference to FIGS. 9 and 10. The deblocking direction refers to a direction in which the deblocking filtering is performed. That is, as shown in FIG. 10, the deblocking direction is a direction forming a right angle with the block boundary to be deblocked. Alternatively, as shown in FIG. 12, the deblocking direction may be a direction forming a predetermined angle with the block boundary. In addition, when determining whether the deblocking direction of the current block and the intra prediction direction are identical to each other, if the deblocking direction and the intra prediction direction are not exactly identical to each other but within a predetermined range of difference, the deblocking direction and the intra prediction direction may be considered to be the same depending on implementations.

Hereinafter, the process of determining the filtering strength by the filtering strength determination unit 510 will be described in more detail with reference to various embodiments.

Figure 6:
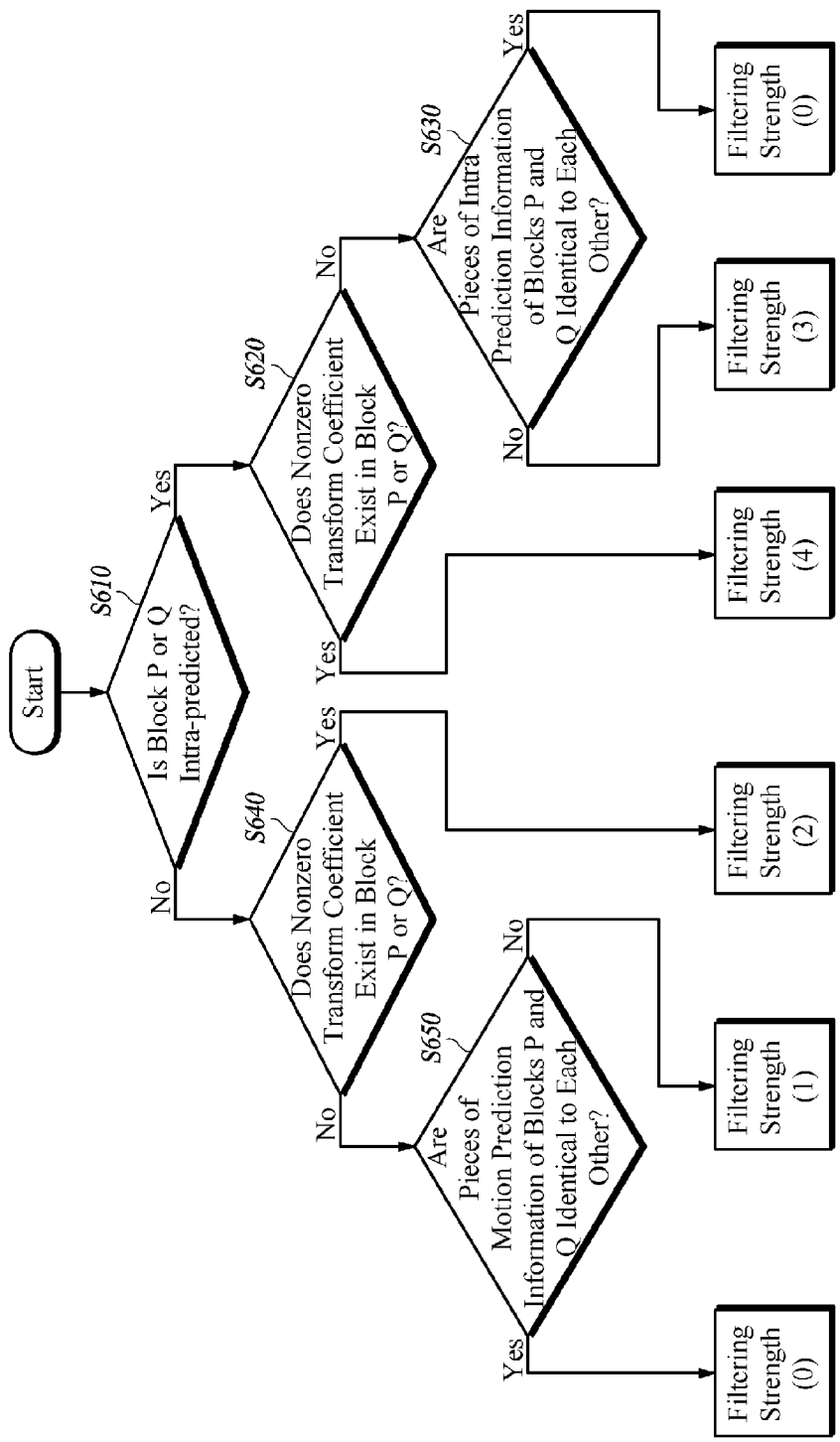
FIG. 6 is a flow diagram showing a process of determining filtering strength according to one or more embodiments of the present disclosure.

FIG. 6 is a flow diagram showing a process of determining the filtering strength according to one or more embodiments of the present disclosure.

Figure 2:
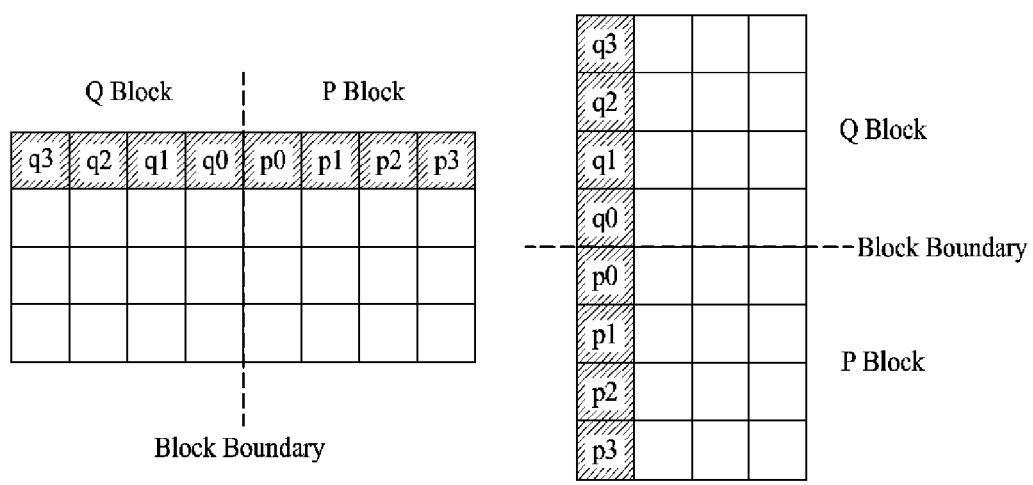
FIG. 2 shows pixels p0, p1, p2 and p3 and pixels q0, q1, q2 and q3 of neighboring blocks P and Q for determining filtering strength.
Figure 3:
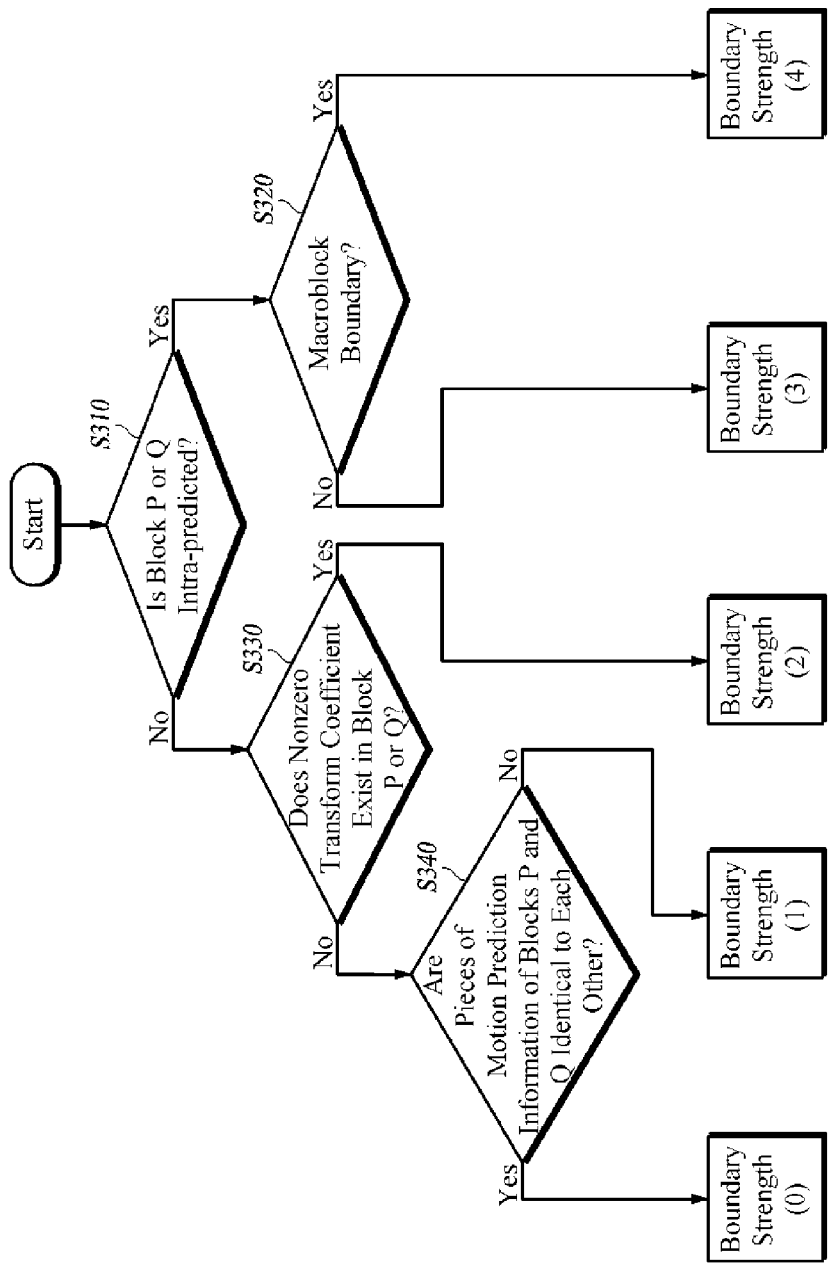
FIG. 3 shows a process of determining filtering strength in the H.264/AVC standard.

Referring to FIG. 6, it is determined whether at least one of a block P and a block Q neighboring a boundary to be filtered, as shown in FIG. 2, has been predicted in an intra mode (S610). If the block P or the block Q is the intra mode, steps S620 and S630 are sequentially performed; if not, steps S640 and 650 are sequentially performed.

When it is determined in step S610 that the block P or the block Q is the intra prediction block, it is determined whether a nonzero transform coefficient exists in residual data of the block P and the block Q (S620). When the nonzero transform coefficient does not exist in the residual data of the block P and the block Q, step S630 is performed; otherwise, a filtering strength value becomes 4. That is, in the case where the nonzero transform coefficient exists in the residual data of the block P and the block Q, blocking artifact is significantly generated by transform and quantization. Therefore, strong filtering is performed. For example, the filtering strength is adaptively determined according to whether the block boundary is the macroblock boundary or which block uses intra encoding. Strong filtering is applied to a region where block distortion easily occurs. In the opposite case, filtering is minimized. In this manner, video quality degradation can be prevented from occurring by unnecessary filtering. If blocking artifact severely occurs, even the inside of the block may be affected. Therefore, blocking artifact is reduced by performing filtering on much more pixels within the block. For example, referring to Equations 1 and 2, which are to be described below, blocking artifact may be alleviated by performing filtering on only p1, p0, q0, and q1 in the case where blocking artifact is not severe, as expressed in Equation 1, and by performing filtering on p2, p1, p0, q0, q1, and q2 in the case where blocking artifact is severe, as expressed in Equation 2.

When step S620 determines that the nonzero transform coefficient does not exist in the residual data of the block P and the block Q, it is determined whether the intra prediction information of the block P and the intra prediction information of the block Q are identical to each other (S630). In the embodiment of the present disclosure, when the intra prediction block sizes and the intra prediction modes of the block P and the block Q are identical, the intra prediction information of the block P and the intra prediction information of the block Q are determined as identical to each other. For example, when the block P is the intra prediction mode and the block Q is the inter prediction mode, when the block P is the intra 16×16 prediction mode and the block Q is the intra 4×4 prediction mode, or when the block P is the intra 4×4 zeroth prediction mode and the block Q is the intra 4×4 first prediction mode, the intra prediction information of the block P and the intra prediction information of the block Q are determined as not identical to each other. In the embodiment of the present disclosure, the determining process of step S620 has been defined on the assumption that the intra prediction method of the H.264/AVC standard is used, but the determining process of step S620 may also be defined in various methods according to applications and purposes.

When step S620 determines that the intra prediction information of the block P and the intra prediction information of the block Q are identical to each other, the filtering strength value becomes 0; otherwise, the filtering strength value becomes 3. That is, since the block P and the block Q use different prediction methods when the intra prediction information of the block P and the intra prediction information of the block Q are not identical to each other, there occurs blocking artifact caused by prediction. Therefore, weaker deblocking filtering is performed as compared with the case where the nonzero transform coefficient exists in the residual data of the block P or the block Q. Since the block P and the block Q use the same prediction method when the intra prediction mode of the block P and the intra prediction mode of the block Q are identical to each other, there is no occurrence of blocking artifact caused by prediction. Therefore, deblocking filtering is not performed.

When step S610 determines that neither of the block P and the block Q is the intra prediction block, it is determined whether the nonzero transform coefficient exists in the residual data of the block P or the block Q (S640). When the nonzero transform coefficient does not exist in the residual data of the block P or the block Q, step S650 is performed; otherwise, a filtering strength value becomes 2.

When step S640 determines that the nonzero transform coefficient does not exist in the residual data of the block P or the block Q, it is determined whether the inter prediction information of the block P and the inter prediction information of the block Q are identical to each other (S650). When the block P and the block Q use different reference pictures or make reference to different blocks while using the same reference picture, or when the block P and the block Q have different motion vector values, the inter prediction information of the block P and the inter prediction information of the block Q are determined as not identical to each other.

When it is determined in step S650 that the inter prediction information of the block P and the inter prediction information of the block Q are identical to each other, the filtering strength value becomes 0; otherwise, the filtering strength value becomes 1.

Figure 7:
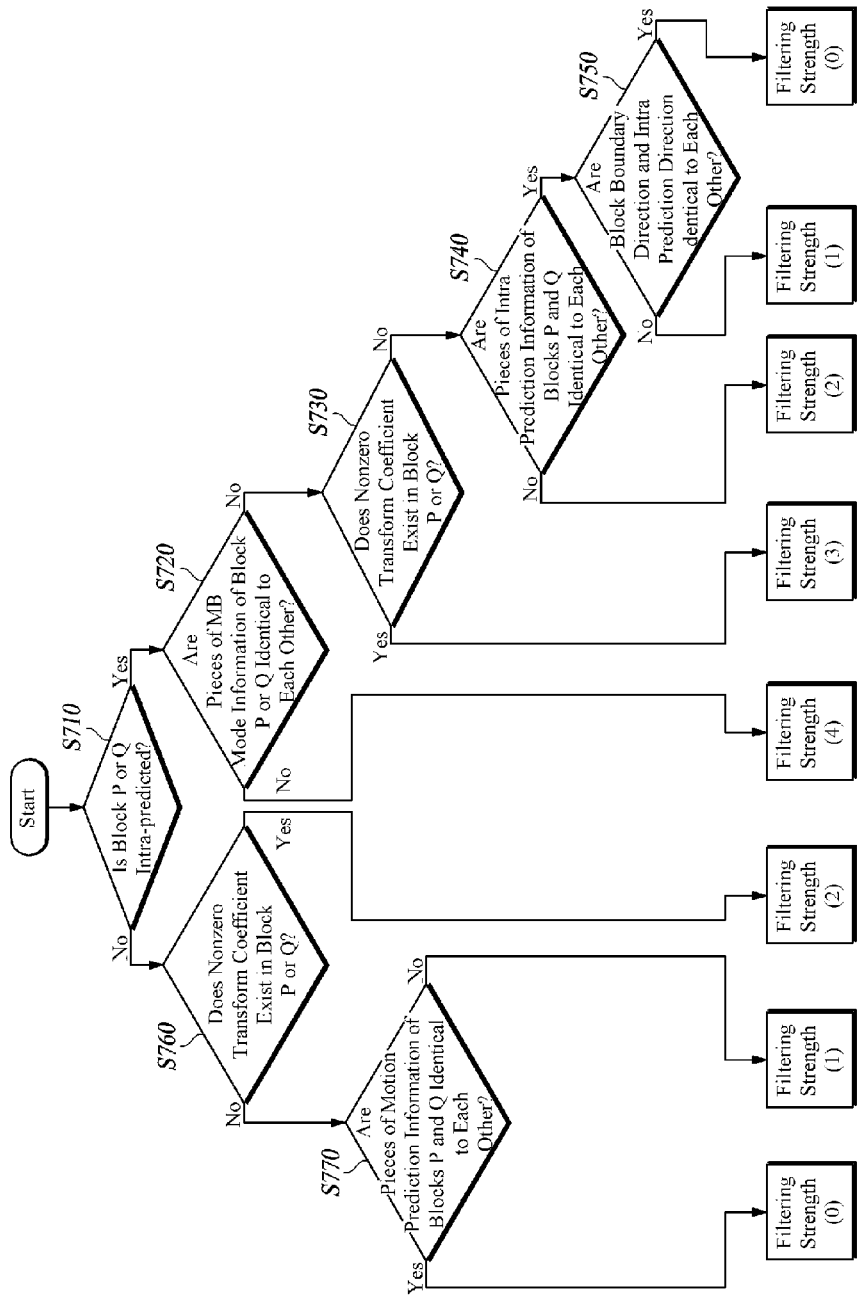
FIG. 7 is a flow diagram showing a process of determining filtering strength according to another embodiment of the present disclosure.

FIG. 7 is a flow diagram showing a process of determining filtering strength according to another embodiment of the present disclosure.

Since steps S710, S760 and S770 of FIG. 7 are substantially identical to steps S610, S640 and S650 of FIG. 6, steps S720 to S750 will be described in more detail.

When step S710 determines that at least one of the block P and the block Q has been intra-predicted, it is determined whether the macroblock mode information of the block P and the macroblock mode information of the block Q are identical to each other (S720). When the macroblock mode information of the block P and the macroblock mode information of the block Q are not identical to each other, the filtering strength value becomes 4.

On the other hand, when the macroblock mode information of the block P and the macroblock mode information of the block Q are identical to each other, it is determined whether the nonzero transform coefficient exists in at least one of the block P and the block Q (S730). When the nonzero transform coefficient exists in at least one of the block P and the block Q, the filtering strength value becomes 3.

When it is determined in step S730 that no transform coefficient exists in the block P and the block Q, the process proceeds to step S740 to determine whether the intra prediction information of the block P and the intra prediction information of the block Q are identical to each other. When it is determined that the intra prediction mode of the block P and the intra prediction mode of the block Q are not identical to each other, the filtering strength value becomes 2.

Figure 8A:
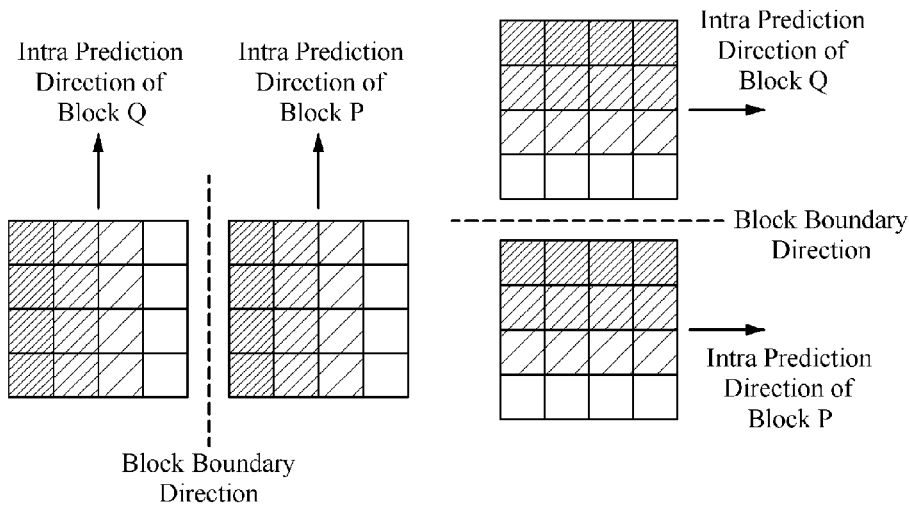
FIG. 8 is an exemplary diagram for describing a process of determining filtering strength according to whether a block boundary direction and an intra prediction direction are identical to each other.
Figure 8B:
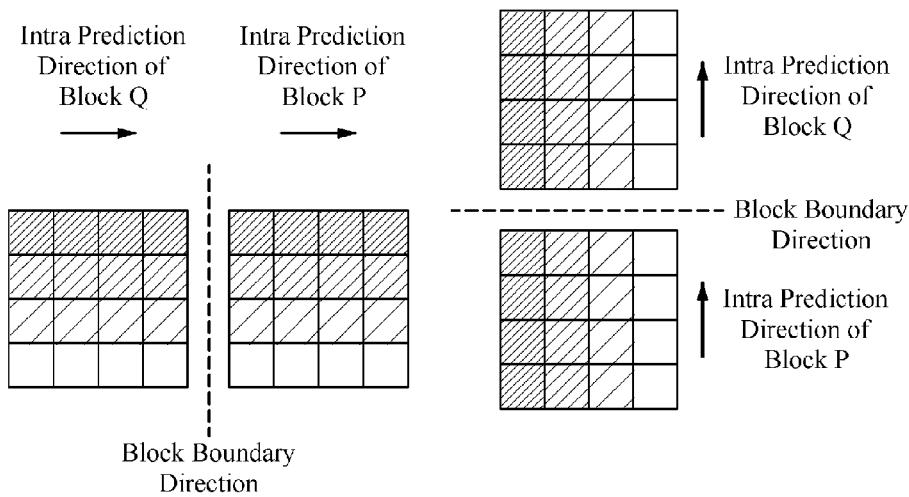

On the other hand, when the intra prediction mode of the block P is determined to be identical to the intra prediction mode of the block Q, it is determined whether the block boundary direction and the intra prediction direction are identical to each other (S750). When two blocks are neighboring each other in a horizontal direction, the block boundary (that is, edge) is vertically formed. On the other hand, when two blocks are neighboring each other in a vertical direction, the block boundary (that is, edge) is horizontally formed. Therefore, in step S750, the intra prediction direction and the block boundary direction (that is, whether the block edge is vertical or horizontal) are compared with each other. In the case where the intra prediction direction and the block boundary direction are not identical to each other, higher filtering strength is assigned than the case where the intra prediction direction and the block boundary direction are identical to each other. That is, as shown in FIG. 8A, when the block boundary (that is, edge) direction and the intra prediction direction are identical to each other, the filtering strength of 0 is assigned. As shown in FIG. 8B, when the block boundary (that is, edge) direction and the intra prediction direction are different from each other, the filtering strength of 1 is assigned.

In the embodiment of the present disclosure, which has been described above with reference to FIGS. 7 and 8, the filtering strength for deblocking filtering is assigned with reference to encoding information of the current block and all neighboring blocks. However, the present disclosure is not limited thereto. As will be described below, the filtering strength for deblocking filtering may also be assigned with reference to only encoding information of the current block. For example, the filtering strength can be adaptively assigned based on at least one of whether the nonzero transform coefficient exists in the current block and whether the intra prediction direction of the current block and the deblocking direction are identical to each other.

Figure 9:
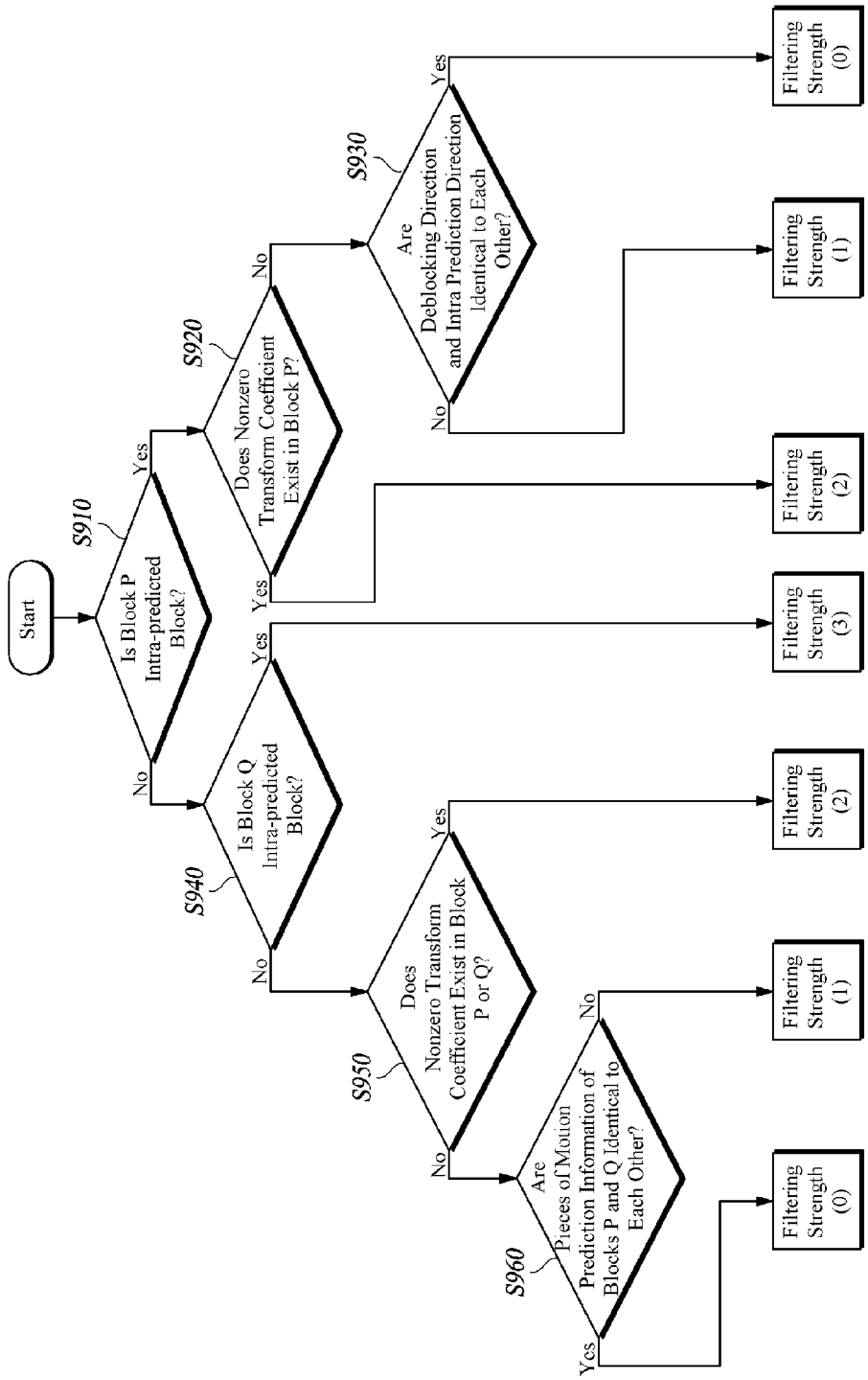
FIG. 9 is a flow diagram showing a process of determining filtering strength according to still another embodiment of the present disclosure.

FIG. 9 is a flow diagram showing a process of determining filtering strength according to still another embodiment of the present disclosure.

Since steps S940, S950 and S960 of FIG. 9 are substantially identical to steps S610, S640 and S650 of FIG. 6, steps S910, S920 and S930 will be described below in more detail.

First, it is determined whether the block P being the current block P is the intra-predicted block (S910). When it is determined that the block P is not the intra-predicted block, the process proceeds to steps S940 to S960 which are substantially identical to steps S610, S640 and S650.

On the other hand, when it is determined in step S910 that the block P being the current block is the intra-predicted block, the filtering strength for deblocking filtering is determined with reference to only encoding information of the current block, without considering information of the blocks neighboring the current block, for example, according to whether the nonzero transform coefficient exists in the current block, whether the deblocking direction of the current block and the intra prediction direction (prediction mode) are identical to each other, and the like.

For example, when the block P being the current block is the intra-predicted block, it is determined whether the nonzero transform coefficient exists in the block P (S920). In the case where the nonzero transform coefficient exists, higher filtering strength may be assigned than the case where the nonzero transform coefficient does not exist. For example, the filtering strength of 2 may be assigned.

On the other hand, in the case where the nonzero transform coefficient does not exist in the block P being the current block, it is determined whether the deblocking direction of the block P and the intra prediction direction of the block P determined according to the intra prediction mode are identical to each other (S930). In the case where the deblocking direction of the block P and the intra prediction direction of the block P are not identical to each other, lower filtering strength is assigned than the case where the nonzero transform coefficient exists. For example, the filtering strength of 0 is assigned. In the case where the deblocking direction of the block P and the intra prediction direction of the block P are identical to each other, lower filtering strength is assigned than the case where the deblocking direction of the block P and the intra prediction direction of the block P are not identical to each other. For example, the filtering strength of 0 is assigned.

Figure 10A:
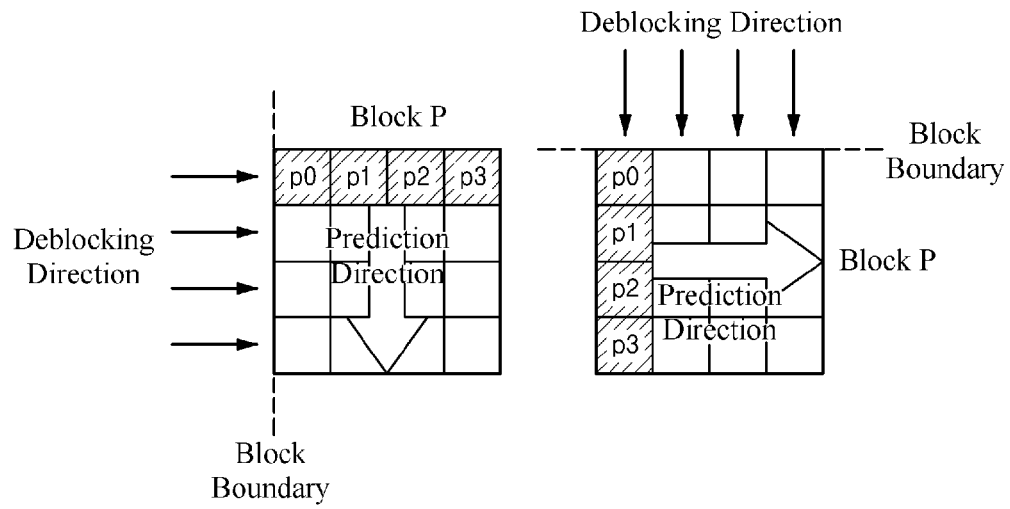
FIG. 10 is a flow diagram showing a process of determining filtering strength according to yet another embodiment of the present disclosure.

As shown in FIG. 10A, in the case where the deblocking direction of the block P being the current block and the intra prediction direction of the block P are not identical to each other, the filtering strength becomes 1.

Figure 10B:
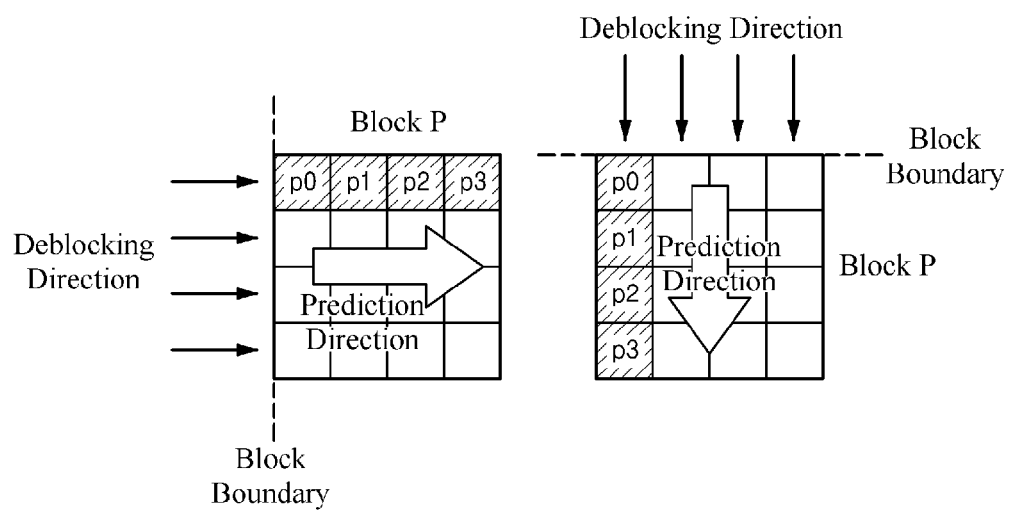

On the other hand, as shown in FIG. 10B, in the case where the deblocking direction of the block P and the intra prediction direction of the block P are identical to each other, lower filtering strength is assigned than the case where they are not identical to each other. For example, the filtering strength of 0 is assigned.

As described above in still another embodiment of the present disclosure, in the case where the current block is the intra prediction block, the filtering strength for deblocking filtering may be determined with reference to only the encoding information of the current block, without considering both of the encoding information of the current block and the encoding information of the neighboring block.

For example, referring to FIG. 10A, in the case where the block P being the current block has been intra-predicted, if the nonzero transform coefficient does not exist in the block P and the deblocking direction and the intra prediction direction are identical to each other, it means that blocking artifact caused by prediction and quantization does not occur in the boundary of the block P. That is, since the predicted value of the block P is predicted from an arbitrary neighboring block, blocking artifact caused by prediction does not occur. Since the nonzero transform coefficient does not exist in the block P, there is also no occurrence of blocking artifact caused by quantization. Therefore, the filtering strength for deblocking may be determined with reference to only the encoding information of the current block, such as whether the current block is the intra prediction block, whether the nonzero transform coefficient exists in the current block, or whether the deblocking direction of the current block and the intra prediction direction are identical to each other.

In FIG. 9, although the filtering strengths determined in steps S920 and S930 are described as identical to the filtering strengths determined in steps S940, S950 and S960, the filtering strengths of both cases may not be identical. All or part of them may have different values.

The detailed embodiments of determining the filtering strength have been described with reference to FIGS. 6 to 10, in the case where at least one of the current block and the neighboring block is intra-predicted or in the case where the current block is intra-predicted. However, it is apparent that these embodiments are merely exemplary for implementing the present disclosure and not to limit the scope of the present disclosure. For example, in order to determine the filtering strength, just one or two or more of the information about existence/nonexistence of the nonzero transform coefficient, the intra prediction information of the current block and the neighboring block, the macroblock mode information of the current block and the neighboring block, the block boundary direction, and the deblocking direction may be used. In addition, in the case where two or more pieces of information are used, the filtering strengths may be determined by sequences other than the sequences of FIGS. 6, 7 and 9.

Referring again to FIG. 5, the deblocking filter unit 460 may further include a filtering pixel determination unit 520 that determines a target pixel to be deblocking-filtered with respect to blocks having nonzero filtering strength.

In particular, in the case where at least one of the current block and the neighboring block is intra-predicted, the filtering pixel determination unit 520 may determine the target pixel, based on the intra prediction information. For example, the filtering pixel determination unit 520 may determine the number of target pixels, based on the intra prediction block size. Furthermore, the position of the target pixel, that is, the filtering direction, may also be determined based on the intra prediction mode. In other words, the position of the target pixel, that is, the filtering direction, may be set as the same concept as the above-described deblocking direction, but the filtering pixel determination unit 520 may also newly determine the filtering direction (position of the target pixel), based on the intra prediction mode. In order to avoid confusion with the term "deblocking direction", the deblocking direction newly determined by the filtering pixel determination unit 520 is newly defined as the filtering direction (position of the target pixel).

Embodiments of determining the target pixel by the filtering pixel determination unit 520 will be described below with reference to FIGS. 11 to 13.

Figure 11:
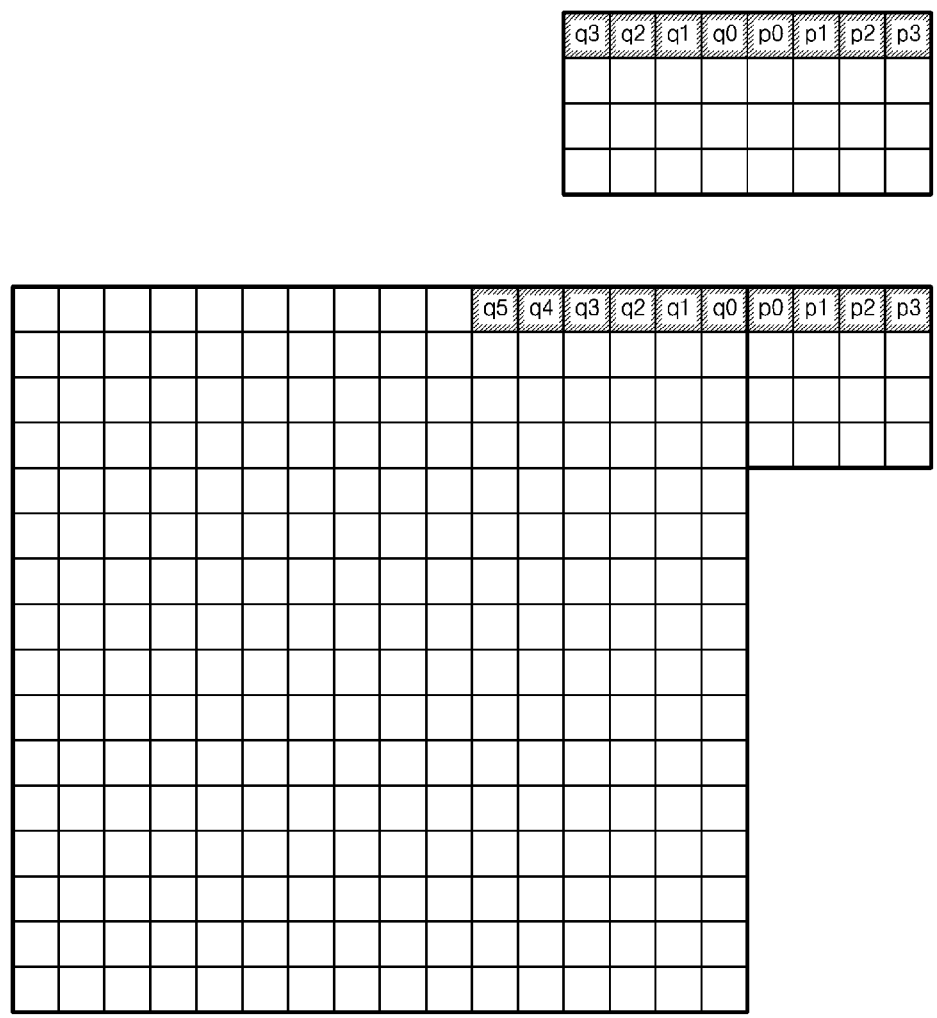

Referring to FIG. 11, the filtering pixel determination unit 520 may determine the number of pixels to be deblocking-filtered at the boundary of intra prediction blocks using different intra prediction sizes. That is, the filtering pixel determination unit 520 can identify the size of the intra prediction block and determine the number of pixels to be deblocking-filtered. For example, in the case where the boundary between an intra 4×4 prediction block and another intra 4×4 prediction block is deblocking-filtered, the number of the pixels to be deblocking-filtered in the block P is four (p0, p1, p2, p3), and the number of the pixels to be deblocking-filtered in the block Q is four (q0, q1, q2, q3). However, in the case where the boundary between the intra 16×16 prediction block and the intra 4×4 prediction block is deblocking-filtered, the number of the pixels to be deblocking-filtered in the block P using the intra 4×4 prediction may be four (p0, p1, p2, p3), and the number of the pixels to be deblocking-filtered in the block Q using the intra 16×16 prediction may be six (q0, q1, q2, q3, q4, q5). This means that as the size of the intra prediction block is larger, more pixels may be subject to deblocking-filtering.

Referring to FIG. 12, the filtering pixel determination unit 520 may determine the positions of pixels to be deblocking-filtered at the boundary of intra prediction blocks using different intra prediction mode. That is, the filtering pixel determination unit 520 can identify the intra prediction block mode and determine the positions of the pixels to be deblocking-filtered.

For example, in the case where the boundary between a 4×4 prediction block (mode 1) and another intra 4×4 prediction block (mode 1) is deblocking-filtered, the positions of the pixels to be deblocking-filtered with respect to the block P are a horizontal direction (p0, p1, p2, p3), and the positions of the pixels to be deblocking-filtered with respect to the block Q are a horizontal direction (q0, q1, q2, q3) (FIG. 12A). However, in the case where the boundary between an intra 4×4 prediction block (mode 3) and another intra 4×4 prediction block (mode 3) is deblocking-filtered, the positions of the pixels to be deblocking-filtered in the block P are a diagonal down-left direction (p0, p1, p2, p3), and the positions of the pixels to be deblocked-filtered in the block Q are a diagonal down-left direction (q0, q1, q2, q3) (FIG. 12B). In the case where the boundary between an intra 4×4 prediction block (mode 4) and another intra 4×4 prediction block (mode 4) is deblocking-filtered, the positions of the pixels to be deblocking-filtered in the block P are a diagonal down-right direction (p0, p1, p2, p3), and the positions of the pixels to be deblocked-filtered in the block Q are a diagonal down-right direction (q0, q1, q2, q3) (FIG. 12C). This means that the positions of the pixels to be deblocking-filtered may be determined considering the direction according to the intra prediction mode.

In addition, the same idea can be applied even when the prediction modes of the neighboring intra prediction blocks are different. For example, in the case where the boundary between an intra 4×4 prediction block (mode 4) and another intra 4×4 prediction block (mode 1) is deblocking-filtered, the positions of the pixels to be deblocking-filtered in the block Q are a diagonal down-right direction horizontal direction (q0, q1, q2, q3), and the positions of the pixels to be deblocking-filtered in the block P are a horizontal direction (p0, p1, p2, p3) (FIG. 12D).

On the other hand, the filtering pixel determination unit 520 may determine the number and positions of the pixels to be deblocking-filtered at the boundary of intra prediction blocks using different intra prediction block sizes and different prediction modes. That is, the filtering pixel determination unit 520 can identify the intra prediction block size and the prediction mode, and determine the number and positions of the pixels to be deblocking-filtered.

Figure 13:
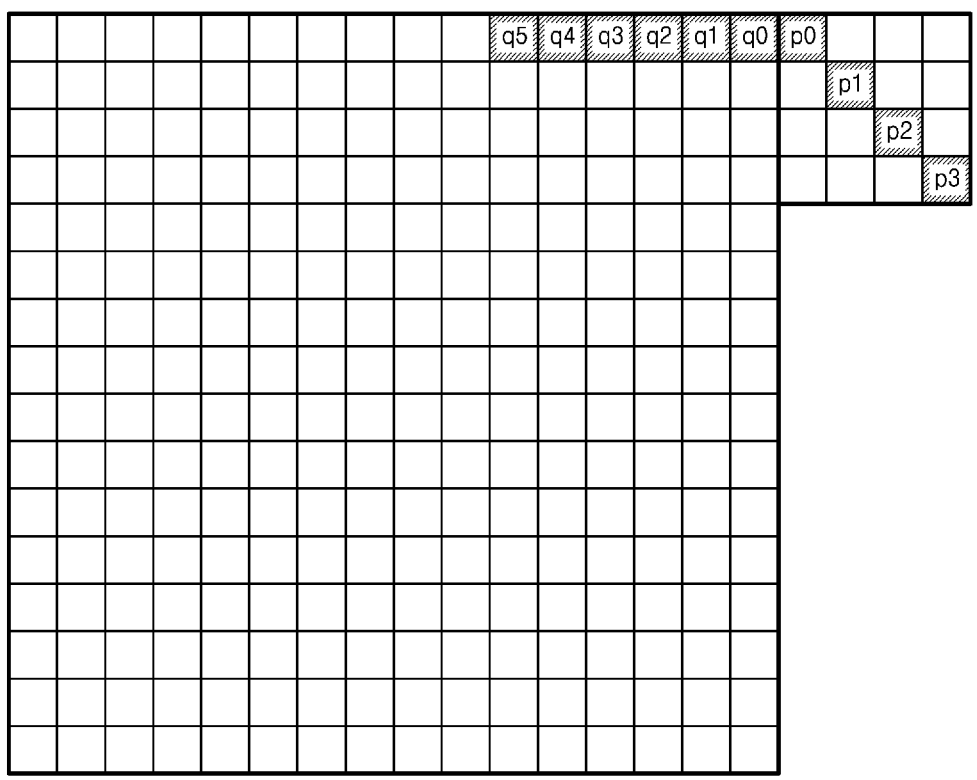

For example, referring to FIG. 13, in the case where the boundary between the intra 16×16 prediction block (horizontal mode) and the intra 4×4 prediction block (mode 4) is deblocking-filtered, the number and positions of the pixels to be deblocking-filtered in the block P are four (p0, p1, p2, p3) and a diagonal down-right direction, and the number and positions of the pixels to be deblocking-filtered in the block Q are six (q0, q1, q2, q3, q4, q5) and a horizontal direction.

Referring again to FIG. 5, when the filtering strength of the corresponding block and the pixels to be filtered are determined by the filtering strength determination unit 510 and the filtering pixel determination unit 520, the deblocking filtering is performed by the filter unit 530.

The filter unit 530 performs filtering with reference to the number and positions of the pixels to be filtered, which are determined by the filtering pixel determination unit 520 according to the filtering strength of the corresponding block determined by the filtering strength determination unit 510.

Hereinafter, the filtering method according to the embodiment of the present disclosure will be described in detail.

In the case whether the filtering strength is lower than four and the number of the pixels to be filtered is equal to or less than four, the filtering is performed as expressed in Equation 1 below.

$$\Delta = \text{Clip}\left[-tc, tc, \frac{\{(q0-p0) \ll 2 + (p1-q1) + 4\}}{8}\right] \quad \text{Equation 1}$$
$$p'0 = p0 + \Delta$$
$$q'0 = q0 + \Delta$$

In Equation 1, a value of tc is determined by a value of β which is determined by the absolute differences |p2−p0| and |q2−q0| of the pixel values of the pixels to be deblocking-filtered and quantization coefficient. In Equation 1, Clip takes a value of {(q0−p0)<<2+(p1−q1)+4}/8, and clipping is performed such that the value of Clip does not exceed −tc and +tc.

As expressed in Equation 1, pixel values p'0 and q'0 which are the deblocking-filtered pixel values of p0 and q0 may be determined through a 4-tap finite impulse response (FIR) filter using q1, q0, p0 and p1. In addition, the filtering may be performed on the pixel values of p'1 and q'1 through a similar method. The number of the pixels to be filtered in the block P is four, and the number of the pixels to be filtered in the block Q is four. The number of the pixels filtered in the block P is two, and the number of the pixels filtered in the block Q is two.

In the case where the filtering strength is four and the number of the pixels to be filtered is equal to or less than four, the filtering is performed as expressed in Equation 2.

$$q'0 = \frac{1 \times q2 + 2 \times q1 + 2 \times q0 + 2 \times p0 + 1 \times p1 + 4}{8} \quad \text{Equation 2}$$

Equation 2 is an example of equation for obtaining 40 in the case where the filtering strength is four. As expressed in Equation 2, 5-tap filtering using q2, q1, q0, p0 and p1 is applied. In addition, filtering is performed on the pixel values p'2, p'1, p'0, q'0, q'1 and q'2 by using a similar manner. The number of the pixels to be filtered in the block P is four, and the number of the pixels to be filtered in the block Q is four. The number of the pixels filtered in the block P is three, and the number of the pixels filtered in the block Q is three.

In the embodiment of the present disclosure, deblocking filtering of different numbers and positions is provided according to the intra prediction block size and the intra prediction mode. That is, as shown in FIGS. 7 and 9, the deblocking filtering may be made to influence more inner pixels.

Therefore, the embodiment of the present disclosure exemplifies a filtering method in the case where the number of pixels to be filtered is six as expressed in Equation 3 below.

$$q'0 = \frac{\begin{array}{c}1 \times q3 + 2 \times q2 + 3 \times q1 + \\ 4 \times q0 + 3 \times p0 + 2 \times p1 + 1 \times p2 + 8\end{array}}{16} \quad \text{Equation 3}$$

Equation 3 is an example of equation for obtaining q'0 in the case where the filtering strength is four. As expressed in Equation 3, 7-tap filtering using q3, q2, q1, q0, p0, p1 and p2 is applied. In addition, filtering is performed on the pixel values p'3, p'2, p'1, p'0, q'0, q'1, q'2 and q'3 in a similar manner. The number of the pixels to be filtered in the block P is six, and the number of the pixels to be filtered in the block Q is six. The number of the pixels filtered in the block P is four, and the number of the pixels filtered in the block Q is four.

As in the example of FIG. 13, in the case where the number of the pixels to be filtered is different in between the block P and the block Q, Equation 2 may be applied to the block P and Equation 3 may be applied to the block Q. Here, the number of the pixels to be filtered in the block P is four, and the number of the pixels to be filtered in the block Q is six. The number of the pixels to be filtered in the block P is two, and the number of the pixels to be filtered in the block Q is four.

Figure 14:
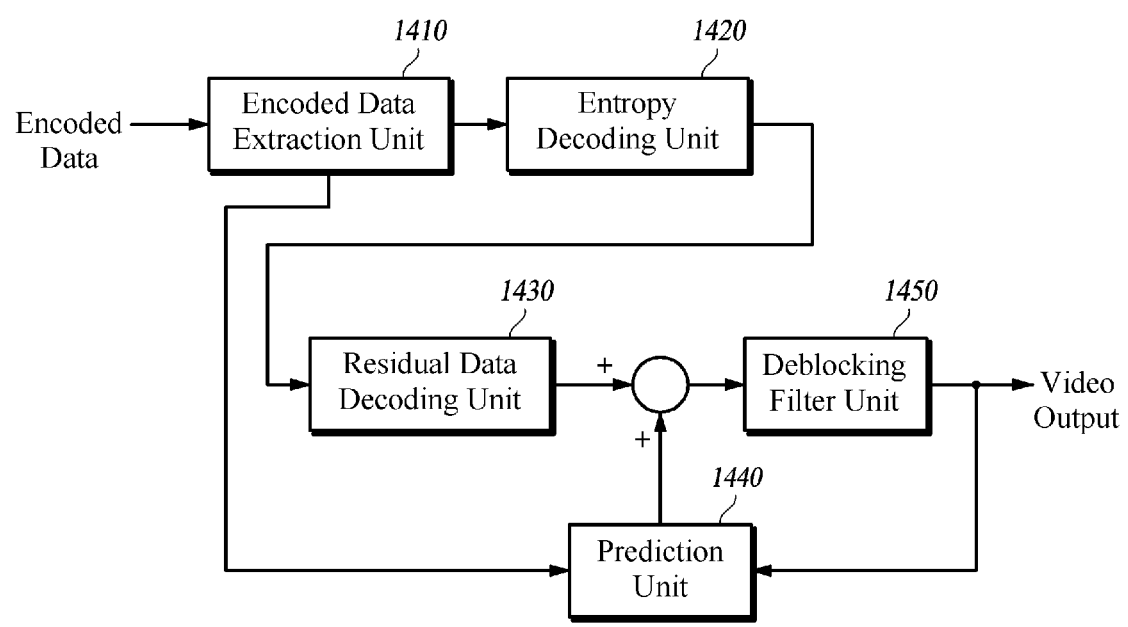
FIG. 14 is a block diagram showing a configuration of a decoding apparatus to which a deblocking filtering apparatus according to one or more embodiments of the present disclosure is applied.

FIG. 14 is a block diagram showing a configuration of a decoding apparatus to which a deblocking filtering apparatus according to one or more embodiments of the present disclosure is applied.

The decoding apparatus, to which the deblocking filtering apparatus according to one or more embodiments of the present disclosure is applied, may include an encoded data extraction unit 1410, an entropy decoding unit 1420, a residual data decoding unit 1430, a prediction unit 1440, and a deblocking filter unit 1450.

The encoded data extraction unit 1410 extracts and analyzes received encoded data and transfers data about a residual block to the entropy decoding unit 1420, and transfers the macroblock mode and the encoded prediction information (for example, the intra prediction mode in the case of the intra encoding, and the information about the reference picture index and the motion vector in the case of the inter encoding) to the prediction unit 1440.

The entropy decoding unit 1420 generates a quantized residual block by performing entropy decoding on the residual block received from the encoded data extraction unit 1410. Although not shown in the embodiment of the present disclosure, if necessary, the entropy decoding unit 1420 may decode various pieces of information necessary for decoding encoded data, as well as the residual block. The various pieces of information necessary for decoding the encoded data may include information about the block type, information about the intra prediction mode when the prediction mode is the intra prediction mode, information about the motion vector when the prediction mode is the inter prediction mode, and information about the transform and quantization type. The entropy decoding unit 1420 may be defined in various methods according to the entropy encoding method used in the entropy encoding unit 440 of the encoding apparatus to which the embodiment of the present disclosure is applied.

The residual data decoding unit 1430 reconstructs the residual block by performing the same process as the residual data decoding unit 430 of the encoding apparatus according to the embodiment of the present disclosure.

The prediction unit 1440 generates a prediction block by performing the same process as the prediction unit 410 of the encoding apparatus according to the embodiment of the present disclosure.

A reconstructed current block is generated by combing the residual block reconstructed through the decoding unit 1430 and the prediction block predicted through the prediction unit 1440.

The deblocking filter unit 1450 filters the reconstructed current block by performing the same process as the deblocking filter unit 460 of the encoding apparatus according to the embodiment of the present disclosure. Since the configuration of the deblocking filter unit 1450 is substantially identical to the configuration of the deblocking filter unit 460 of the encoding apparatus, a detailed description thereof will be omitted.

When utilizing the embodiment of the present disclosure, the deblocking method applied to the luma signal and the deblocking method applied to the chroma signal can be equally implemented. In another embodiment, in its application, the deblocking method for application to the luma signal and the deblocking method for application to the chroma signal can be differently implemented.

It has been described in the above embodiments of the present disclosure that the deblocking filtering is performed based on two neighboring blocks, the present disclosure is not limited thereto. That is, in defining the filtering strength and target pixels for performing the deblocking filtering, two or more blocks may be involved, and it should be construed that this also falls within the spirit of the present disclosure, without departing from the scope of the present disclosure.

In the description above, although all of the components of the embodiments of the present disclosure may have been explained as assembled or operatively connected as a unit, the present disclosure is not intended to limit itself to such embodiments. Rather, within the objective scope of the present disclosure, the respective components may be selectively and operatively combined in any numbers. Every one of the components may be also implemented by itself in hardware while the respective ones can be combined in part or as a whole selectively and implemented in a computer program having program modules for executing functions of the hardware equivalents. Codes or code segments to constitute such a program may be easily deduced by a person skilled in the art. The computer program may be stored in computer readable media, which in operation can realize the embodiments of the present disclosure. The computer readable media may include magnetic recording media, optical recording media, and carrier wave media.

In addition, terms like 'include', 'comprise', and 'have' should be interpreted in default as inclusive or open rather than exclusive or closed unless expressly defined to the contrary. All the terms that are technical, scientific or otherwise agree with the meanings as understood by a person skilled in the art unless defined to the contrary. Common terms as found in dictionaries should be interpreted in the context of the related technical writings not too ideally or impractically unless the present disclosure expressly defines them so.

Although exemplary embodiments of the present disclosure have been described for illustrative purposes, those skilled in the art will appreciate that various modifications, additions and substitutions are possible, without departing from essential characteristics of the disclosure. Therefore, exemplary embodiments of the present disclosure have not been described for limiting purposes. Accordingly, the scope of the disclosure is not to be limited by the above embodiments but by the claims and the equivalents thereof.

INDUSTRIAL APPLICABILITY

As described above, the present disclosure is highly useful for application in the fields of deblocking filtering and video encoding and decoding. A subjective video quality and encoding efficiency can be improved by reducing blocking artifact of an intra prediction block.

The invention claimed is:

1. A decoding apparatus for decoding a video signal, comprising:
  a residual data decoding unit configured to decode a residual block by performing inverse quantizing and inverse transforming;
  a prediction unit configured to generate a prediction block;
  an adder configured to reconstruct pixels of a reconstructed block by adding the prediction block and the residual block; and
  a deblocking filter unit configured to perform deblocking filtering on a block edge corresponding to the reconstructed block, based on whether the block edge corresponds to an edge between prediction blocks as well as whether the block edge corresponds to an edge between transform blocks,
  wherein the deblocking filter unit performs the deblocking filtering by using at least one of
  a first filtering mode which corresponds to a first filtering strength and updates six pixels adjacent to the block edge; and
  a second filtering mode which corresponds to a second filtering strength and updates four or fewer pixels adjacent to the block edge, the first filtering strength being stronger than the second filtering strength,
  wherein the second filtering mode
    calculates a delta value by using
      (i) a first difference between a first most neighboring pixel to the block edge and a second most neighboring pixel to the block edge,
      (ii) a second difference between two pixels which are adjacent to the first most neighboring pixel and the second most neighboring pixel respectively and have the same distance from the block edge, and
      (iii) an offset value, and
    updates the first most neighboring pixel and the second most neighboring pixel by using the delta value,
  wherein an absolute value of a coefficient value corresponding to the second difference is larger than $\frac{1}{16}$ and smaller than the offset value,
  wherein the deblocking filter unit determines number of filtering target pixels based on a predetermined criteria, and wherein
  number of the filtering target pixels included in a first block corresponding to the block edge is different from number of the filtering target pixels included in a second block corresponding to the block edge.

2. The decoding apparatus of claim 1, wherein the transform block is able to have a size which exceed the size of the prediction block.

3. The deblocking apparatus of claim 1, wherein the first filtering mode updates each of the first most neighboring pixel and the second most neighboring pixel by using 5-tap filtering corresponding to five pixels adjacent to the block edge.

* * * * *